United States Patent [19]

McGreevy

[11] Patent Number: 5,295,058
[45] Date of Patent: Mar. 15, 1994

[54] UNIVERSAL DC TO DC POWER CONVERTER

[75] Inventor: William T. McGreevy, Babylon, N.Y.

[73] Assignee: Recoton Corporation, Long Island City, N.Y.

[21] Appl. No.: 959,760

[22] Filed: Oct. 13, 1992

[51] Int. Cl.$^5$ .......................................... H02M 3/335
[52] U.S. Cl. ........................................ 363/26; 363/97; 363/134
[58] Field of Search .................. 363/24, 25, 26, 95, 363/97, 134

[56] References Cited

U.S. PATENT DOCUMENTS

| | | | |
|---|---|---|---|
| 4,489,369 | 12/1984 | Ginsberg | 363/97 |
| 4,691,275 | 9/1987 | Moscovici | 363/26 |
| 4,695,934 | 9/1987 | Steigerwald et al. | 363/134 |
| 5,155,672 | 10/1992 | Brown | 363/26 |
| 5,218,522 | 6/1993 | Phelps et al. | 363/25 |
| 5,245,220 | 9/1993 | Lee | 363/37 |

OTHER PUBLICATIONS

Motorola Linear/Interface Devices, Technical Specification Manual, Technical Specification for Motorola Device TL494 Switchmode Pulse Width Modulation Control Circuits, pp. 3-312 to 3-320, date and place of publication unknown.

Primary Examiner—Jeffrey Sterrett
Attorney, Agent, or Firm—Curtis, Morris & Safford

[57] ABSTRACT

A pulse width modulated DC to DC voltage converter for producing selectable differential output voltages. A feedback voltage and a selectable error voltage are fed back to the controller to control the pulse width by the difference between them. First and second power switches are respectively operable in response to first and second square wave signals output from the controller. The converter includes a center-tapped transformer having first and second output terminals. The outputs from the first and second output terminals are filtered and rectified into respective nominally positive and negative DC output voltages. A first selector switch for selectively connecting the nominally negative voltage output terminal to either a grounded bus or a negative bus is mechanically ganged to a second selector switch having a plurality of positions for selecting one of a plurality of predetermined error voltages. Movement of the selector switches changes the values of the positive and negative DC voltages at the respective output terminals.

8 Claims, 2 Drawing Sheets

UNIVERSAL DC TO DC POWER CONVERTER

BACKGROUND OF THE INVENTION

1. Field of the Invention

This invention relates to DC to DC electrical power voltage conversion, and in particular to a DC to DC converter employing a pulse width modulation controller.

2. Description of the Prior Art

Portable electronic devices, such as portable radios, cassette recorders/players, CD players and the like have become increasingly popular. It is frequently desirable to operate such devices in an automobile, however, the life of the batteries contained in the portable devices is limited. Accordingly, on long trips it would be desirable to make use of the automobile's battery power. However, very few portable electronic devices use the twelve volt DC power commonly available in automobiles and require any one of a number of different voltages, including 3 volts, 4.5 volts, 6 volts, 7.5 volts, 9 volts or 12 volts. In view of this, the ability of a single voltage converter to operate a number of electronic devices from a voltage source available in an automobile, such as through a cigarette lighter, has been limited.

OBJECT OF THE INVENTION

Accordingly, it is an object of this invention to provide a universal DC-DC power converter suitable for powering a DC powered device with any one of a plurality of battery voltage requirements from an automotive-type DC voltage source.

SUMMARY OF THE INVENTION

This and other objects of the invention are achieved in accordance with a preferred embodiment of the invention including a DC to DC voltage converter for producing selectable differential output voltages between a nominally positive output terminal and a nominally negative output terminal and having means for connecting to a source of DC supply voltage. The voltage converter also includes means for producing a feedback voltage proportional to the voltage at the nominally positive output terminal, means for producing a selectable error voltage having a plurality of predetermined values and a pulse width modulation controller having means for producing first and second complementary and non-overlapping square wave signals at respective first and second signal outputs each having a substantially constant peak voltage and a pulse width controlled by the difference between the feedback voltage and the selectable error voltage to increase the pulse width as the difference increases and to decrease the pulse width as the difference decreases. The converter also includes first power switch means having one grounded terminal operable in response to the first square wave signal and second power switch means having one grounded terminal operable in response to the second square wave signal. A transformer having a center-tapped primary winding having a first terminal connected to the first power switch, a second terminal connected to the second power switch and a center-tap connected to the source of DC power are also preferrably provided. The transformer further preferrably includes a center-tapped secondary winding having first and second outputs producing an alternating output voltage and a center tap connected to a grounded bus. Means for rectifying and filtering the alternating output voltage from the first output into a positive DC voltage at a positive bus and means for rectifying and filtering the alternating output voltage from the second output into a negative DC voltage at a negative bus are also provided. The converter also includes means for connecting the nominally positive voltage output terminal to the positive bus and first switching means having a plurality of positions for selectively connecting the nominally negative voltage output terminal to either the grounded bus or the negative bus. Second switching means having a plurality of positions are provided for selectively setting the error voltage to one of the plurality of predetermined values thereby to change the values of the positive DC voltage at the positive bus and the negative DC voltage at the negative bus to predetermined values. The first and second switching means are preferrably mechanically ganged to operate together thereby to provide a plurality of predetermined differential voltages between the nominally positive output terminal and the nominally negative output terminal.

These and other objects, features and advantages of the present invention will be apparent to those of ordinary skill in the art upon review of the drawings and description herein, wherein:

DETAILED DESCRIPTION

Figure 2:
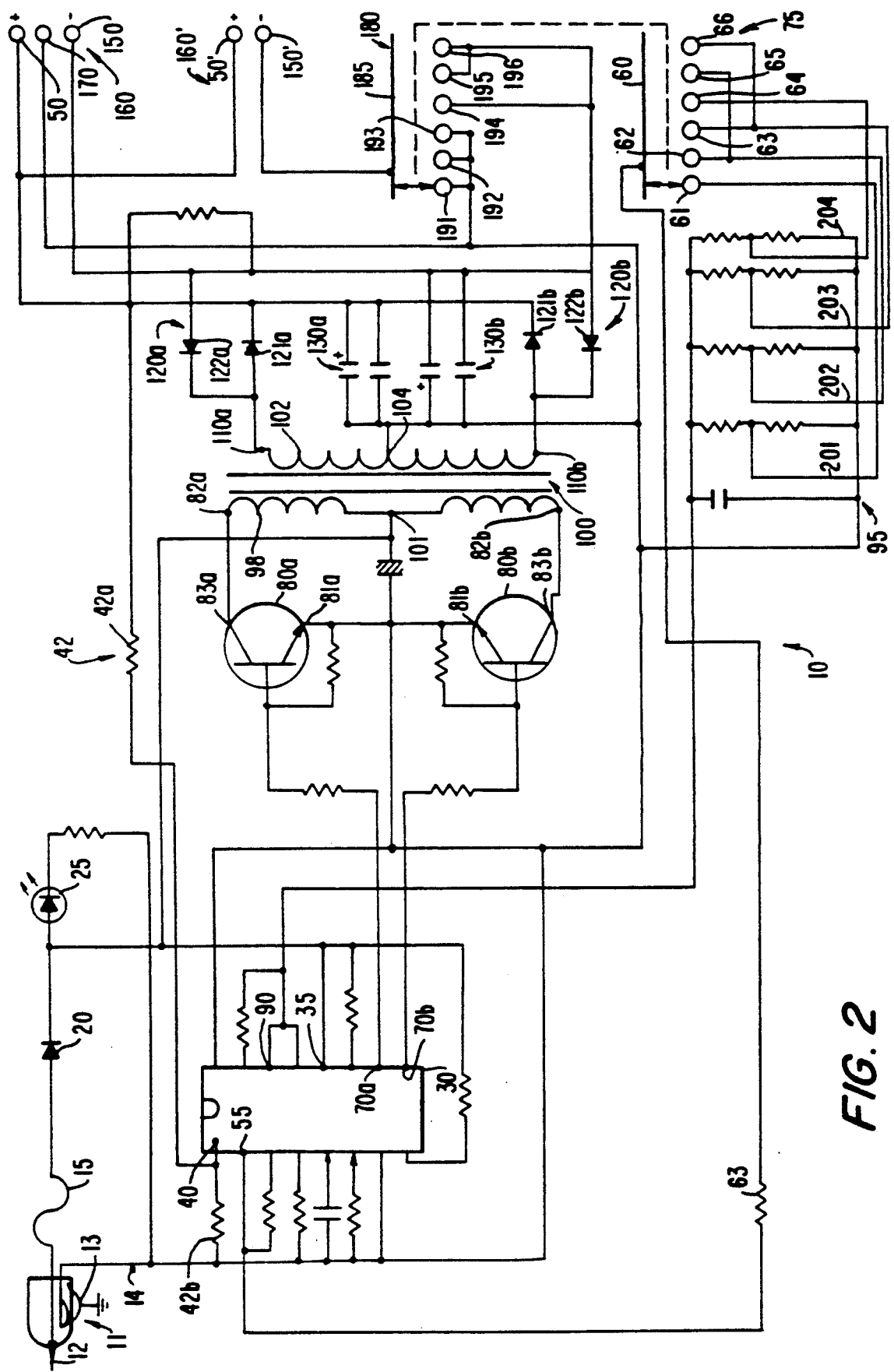
FIG. 2 is a detailed schematic depicting a preferred embodiment of the inventive converter.

Referring now to the drawings in detail, in accordance with a favorable embodiment of this invention, a power converter 10 for converting from DC power voltages in the range of those existing on automobiles, e.g., 12 volts, to a number of selectable DC output voltages includes a connection 11 to the DC source voltage. As depicted in FIG. 2, connection 11 is advantageously an automotive cigarette lighter plug. As also depicted in FIG. 2, connection 11 typically includes a center contact 12 adapted to connect to the positive battery voltage of the automobile, and a exterior contact 13 connected to a ground bus 14 and adapted to connect to the ground of the vehicle. Current from the positive contact 12 is fed through a fuse 15, then through a diode 20 for polarity protection. A light emitting diode 25 is included for a power "on" indication.

Figure 1:
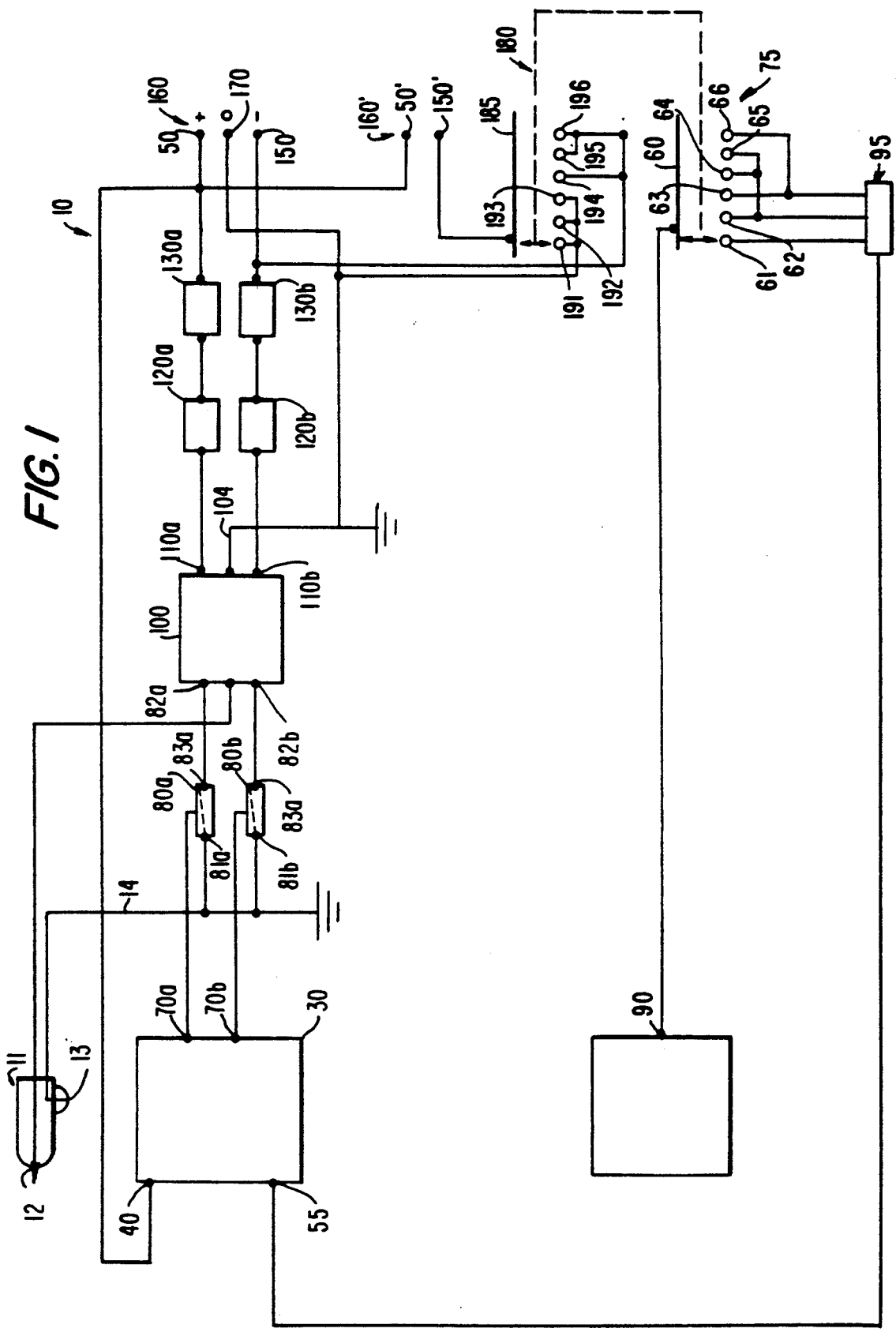
FIG. 1 is a simplified block diagram depicting the operation of a preferred embodiment of the the inventive converter.

The power converter 10 includes a pulse width modulation controller 30 for switchmode power circuits, which is conveniently a Motorolla TL494 controller. The controller 30 includes a power input 35 (not shown in FIG. 1) for providing 12 volts DC to power the controller. Controller 30 also includes a feedback input 40 connected to the nominally positive output terminal 50 through a voltage divider 42 comprised of resistor 42a between terminal 50 and feedback input 40, and resistor 42b between feedback input 40 and ground bus 14. In this way, the voltage at feedback input 40 will be substantially proportional to the voltage at the nominally positive output terminal 50.

Controller 30 also includes error voltage input 55, which is connected to the common contact 60 of a six position selector switch 75 through a resistor 63.

Controller 30 also includes a first square wave signal output 70a and a second square wave signal output 70b for outputting a square wave which is non-overlapping with and complementary to the first square wave signal. The internal circuitry of controller 30 varies the pulse width of the first and second square wave signals in a well known manner in proportion to the difference between the voltage at the feedback input 40 and the voltage at the error voltage input 55 of the controller, increasing the pulse width as the difference increases and decreasing the pulse width as the difference decreases.

Power supply 10 also includes a reference voltage source 90 outputting an approximately constant 5.0 volts. As depicted in FIG. 2, this is conveniently contained on the same circuit as controller 30, although this is not required. The reference voltage source 90 is used to produce a selectable error voltage for inputting to error voltage input 55 through selector switch 62 and error voltage producer 95, in a manner to be described.

The first and second signal outputs from the controller are fed, respectively, to first and second power switch means 80a and 80b. As depicted in FIG. 2, these are conveniently NPN power transistors.

Each of the first and second power switch means 80a and 80b has one power terminal, 81a and 81b, respectively, grounded. The other power terminals 83a and 83b of each of the first and second power switch means 80a and 80b is connected to respective input terminals 82a and 82b of the primary coil 98 of a center-tapped transformer 100. The center-tap 101 of the transformer is conveniently connected to the positive power terminal 12 leading from the automotive cigarette lighter plug. It will be readily apparent to one of ordinary skilled in the art, however, that the circuit would function equally well with the center-tap grounded and the respective ends of the primary coil connected to positive voltage using PNP transistors, if desired.

The secondary coil 102 of transformer 100 also preferrably includes a center-tapped secondary, the center-tap 104 of which is grounded. The center-tapped secondary coil has a first output terminal 110a and a second output terminal 110b. The output voltage from the first output terminal 110a will be an alternating voltage substantially equal to the voltage at the second output terminal 110b of the secondary coil 102.

The alternating current from the first output terminal 110a is rectified by means of rectifier bridge 120a, which is conveniently a diode 121a connected to the nominally positive output terminal 50 and a diode 122a connected to the nominally negative output terminal 150. The output is filtered by a pair of capacitors 130a.

The alternating current from the second output terminal 110b of secondary coil 102 is similarly rectified by means of rectifier bridge 120b, which is conveniently a diode 121b connected to the nominally positive output terminal 50 and a diode 122b connected to the nominally negative output terminal 150. The output is filtered by a pair of capacitors 130b. Of course, other arrangements of the rectifier bridge and the capacitor could be employed.

The rectified and filtered DC positive voltage is fed to the nominally positive output terminal 50 and the rectified and filtered negative DC output is fed to the nominally negative output terminal 150. Terminals 50 and 150 comprise two of three of the output terminals of a three conductor dual polarity output plug 160, (i.e. positive, negative and ground). The remaining terminal is a ground terminal 170 connected to ground bus 14.

The rectified and filtered positive DC output is also fed to a nominally positive output terminal 50' of a two conductor output plug 160'. Preferrably, plugs 160 and 160' are each snap connectors adapted to removably receive a plurality of plug types.

The rectified and filtered negative DC output is not, however, fed directly to the nominally negative terminal 150' of the two conductor plug 160'. Instead, the rectified and filtered negative DC output is first fed to a manually operable, six-position selector switch 180 having one common contact 185 and six selectable contacts 191, 192, 193, 194, 195 and 196. Contacts 194, 195 and 196 are connected to the rectified and filtered negative DC output, and contacts 191, 192 and 193 are connected to the ground bus 14.

With this six-position selector switch, the nominally negative output terminal can be selectively connected to ground by selecting the contacts 191, 192, 193 or 194 thus connecting the common contact 185 to ground. The filtered and rectified negative DC output can be connected to common contact 185 by selecting from the three contacts 194, 195 or 196.

Selector switch 180 is mechanically ganged to a selector switch 75, which also has six contacts, 61, 62, 63, 64, 65, and 66, arranged to contact in synchronism with the respective six selectable contacts of selector switch 180. Selector switch 62 permits selection of one of a plurality of predetermined error voltages produced by an error voltage producer 95 for inputting to error voltage input 55 of controller 30. As depicted in FIG. 2, error voltage producer 95 is conveniently comprised of a network of four voltage dividers 201, 202, 203 and 204.

Contact 61 is connected to the voltage reference source 90 through voltage divider 201. Contacts 62, 64 and 65 are connected to the voltage reference source 90 through voltage divider 202. Contacts 63 and 66 are connected to the voltage reference source 90 through voltage divider 203. The common contact 60 of the selector switch 62 is fed into the error voltage input 90 of the pulse width modulation controller 30. In this manner, the error voltage will assume one of four different values depending upon which of the contacts 61, 62, 63, 64, 65 or 66 is selected. This error voltage, coupled with the feedback voltage from the nominally positive output terminal 50 fed back to feedback input 40 will, in turn, controls the pulse width of the square wave signals output from the first and second signal outputs 70a and 70b of controller 30, hence ultimately controlling the positive and negative DC rectified and filtered voltages to assume one of six predetermined values, preferrably, 3 volts, 4.5 volts, 6 volts, 7.5 volts, 9 volts and 12 volts.

The invention provides this wide range of output voltages through the novel arrangement of selector switch 180 (the first selector switch) and selector switch 75 (the second selector switch). That is, the first three contacts 191, 192 and 193 of the first selector switch 185 are all commonly connected to ground. However, the first three contacts 61, 62 and 63 of the second selector switch are each connected to a different voltage divider, 201, 202 or 203, respectively. Hence, even though the nominally negative output terminal is connected to the ground in all three of the first three contact positions, the error voltage will assume one of three different predetermined values, thereby causing the output voltage at the nominally positive and nominally negative output terminals to assume one of three different predetermined values.

The fourth contact 64 of the second selector switch 75 is connected to voltage divider 204. The fourth contact 194 of the first selector switch 180 is connected to the rectified and filtered negative output. Thus, a fourth output voltage is provided. The fifth and sixth contacts, 195 and 196, respectively, of the first selector switch are both connected to the rectified and filtered DC output from terminal 110b of the secondary coil 102. However, the fifth and sixth contacts 65 and 66 of the second selector switch 75 are each connected to different voltage dividers, 202 and 203, respectively. Thus, different differential voltages between the nominally positive and nominally negative output terminals 50' and 150' for each of the fifth and sixth contact positions are provided. In this manner, six differential voltages are possible between the nominally positive and negative output terminals 50' and 150' even though only four different voltage dividers are used to produce four different error voltages for inputting to the error voltage input 55 of the controller 30. Thus, the number of selectable output voltages possible with the device is increased, without unduly increasing the complexity of the device.

Although the invention has been depicted and described with reference to a preferred embodiment of the invention, it should be understood that the invention is not limited to the above-described embodiment, and many modifications and variations can be carried out by those skilled in the art without departing from the scope and spirit of the invention as defined in the appended claims.

I claim:

1. A DC to DC voltage converter for producing selectable differential output voltages at a nominally positive output terminal and a nominally negative output terminal comprising:

means for connecting to a source of DC supply voltage;

means for producing a feedback voltage proportional to the voltage at said nominally positive output terminal, means for producing a selectable error voltage having a plurality of predetermined values, a pulse width modulation controller having means for producing first and second complementary and non-overlapping square wave signals at respective first and second signal outputs each having a substantially constant peak voltage and a pulse width controlled by the difference between said feedback voltage and said selectable error voltage to increase said pulse width as said difference increases and to decrease said pulse width as said difference decreases, first power switch means having one grounded terminal operable in response to said first square wave signal and second power switch means having one grounded terminal operable in response to said second square wave signal, a transformer having a center-tapped primary winding having a center-tap connected to said source of DC power, a first terminal connected to said first power switch and a second terminal connected to said second power switch;

a center-tapped secondary winding having first and second output terminals each producing an alternating output voltage and a center tap connected to a grounded bus;

means for rectifying and filtering said alternating output voltage from said first output into a positive DC voltage at a positive bus;

means for rectifying and filtering said alternating output voltage from said second output into a negative DC voltage at a negative bus;

means for connecting said nominally positive output terminal to said positive bus;

first switching means having a plurality of positions for selectively connecting said nominally negative output terminal to either said grounded bus or said negative bus; and second switching means having a plurality of positions for selectively setting said error voltage to one of said plurality of predetermined values thereby to change the values of said positive DC voltage at said positive bus and said negative DC voltage at said negative bus to predetermined values;

said first and second switching means being mechanically ganged to operate together thereby to provide a plurality of predetermined differential voltages between said nominally positive output terminal and said nominally negative output terminal.

2. The voltage converter defined in claim 1 wherein said means for connecting to a source of DC supply voltage is a plug adapted to fit into an automotive cigarette lighter.

3. The voltage converter defined in claim 2 wherein said positive and negative output terminals are adapted to removably receive a plurality of plug types.

4. The voltage converter defined in claim 3 further including a ground terminal, said nominally negative output terminal, said ground terminal and said nominally positive output terminal being adapted to removably receive a three conductor, dual polarity connector.

5. A DC to DC voltage converter for producing selectable differential output voltages at a nominally positive output terminal and a nominally negative output terminal comprising:

means for connecting to a source of DC supply voltage;

a voltage divider for producing a feedback voltage proportional to the voltage at said nominally positive output terminal, a set of voltage dividers for producing a selectable error voltage having a plurality of predetermined values, a pulse width modulation controller having means for producing first and second complementary and non-overlapping square wave signals at respective first and second signal outputs each having a substantially constant peak voltage and a pulse width controlled by the difference between said feedback voltage and said selectable error voltage to increase said pulse width as said difference increases and to decrease said pulse width as said difference decreases, a first transistor having one grounded terminal operable in response to said first square wave signal and a second transistor having one grounded terminal operable in response to said second square wave signal, a transformer having a center-tapped primary winding having a first terminal connected to said first power switch, a second terminal connected to said second power switch and a center-tap connected to said source of DC power, and a center-tapped secondary winding having a center tap connected to a grounded bus and first and second output terminals each producing an alternating output voltage;

a diode bridge for rectifying and a capacitor for filtering said alternating output voltage from said first output into a positive DC voltage at a positive bus;

a diode bridge for rectifying and a capacitor for filtering said alternating output voltage from said second output into a negative DC voltage at a negative bus;

means for connecting said nominally positive output terminal to said positive bus;

first switching means having a plurality of positions for selectively connecting said nominally negative output terminal to either said grounded bus or said negative bus; and second switching means having a plurality of positions for selecting one said sets of voltage dividers to set said error voltage to one of said plurality of predetermined values thereby to change the values of said positive DC voltage at said positive bus and said negative DC voltage at said negative bus to predetermined values;

said first and second switching means being mechanically ganged to operate together thereby to provide a plurality of predetermined differential voltages between said nominally positive output terminal and said nominally negative output terminal.

6. The voltage converter defined in claim 5 wherein said means for connecting to a source of DC supply voltage is a plug adapted to fit into an automotive cigarette lighter.

7. The voltage converter defined in claim 6 wherein said positive and negative output terminals are adapted to removably receive a plurality of plug types.

8. The voltage converter defined in claim 7 further including a ground terminal, said nominally negative output terminal, said ground terminal and said nominally positive output terminal being adapted to removably receive a three conductor, dual polarity connector.

* * * * *